UNITED STATES PATENT OFFICE.

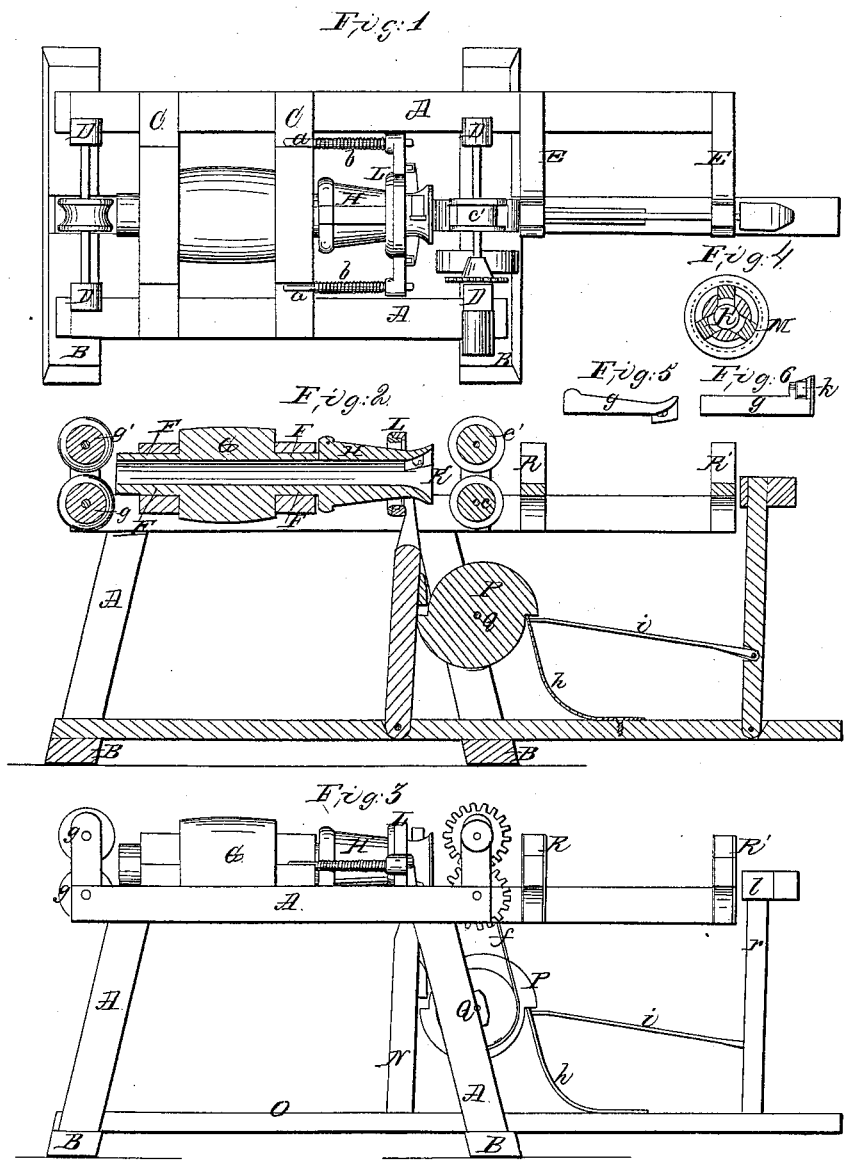

J. BURNS WEST, OF LAKEVILLE, NEW YORK.

IMPROVEMENT IN WOOD-TURNING LATHES.

Specification forming part of Letters Patent No. 54,047, dated April 17, 1866.

*To all whom it may concern:*

Be it known that I, J. BURNS WEST, of Lakeville, in the county of Livingston and State of New York, have invented a new and useful Improvement in Lathes for Turning Tapering Stuff; and I do hereby declare that the following is a full, clear, and accurate description of the construction and operation of the same, reference being had to the annexed drawings, making a part of this specification, in which—

Figure 1 represents a top view of my improved lathe; Fig. 2, a longitudinal central section through the same; Fig. 3, a side elevation thereof; and Figs. 4, 5, and 6 are sections of parts of the conical head and cutters.

It is the object of my invention to turn tapering stuff—such, for example, as ship's spars, boat-poles, fork, rake, hoe, or broom handles—by passing each piece through a hollow mandrel and delivering it finished with any desired taper; and my invention consists, first, in a hollow taper-chuck having cutters which are pivoted to the chuck at one end and expand from the chuck by or from centrifugal action; second, in a sliding ring moved automatically back and forth upon the chuck to vary the action of the cutters and control the taper of the article being turned; third, in automatically governing the movement of the ring on the chuck by a cam to give the taper desired; fourth, in the mechanism governed by the cam-wheel, for striking the lowest stick in the brackets a blow to force it between the feed-rollers; fifth, in combining the chuck, the rim, and the cam with brackets for holding blanks and feed-rollers to receive the regular progression of the stick to be turned through the hollow chuck.

A proper lathe-frame, A, of any suitable material, is supported on bed-pieces B, and sustains cross-braces C, studs D and D', and brackets E and E' on its top.

A hollow mandrel, F, is supported centrally on suitable bearings in the cross-pieces C, and may have, if necessary, adjustable boxes. On this mandrel F, between the supports C, a driving-pulley, G, is firmly secured, to be rotated by a belt from any proper motor. The front end of the mandrel F carries a hollow cone-shaped chuck, H, in which there are three longitudinal grooves, in each of which, pivoted at its rear end, is a bar, I. These bars I are so placed in the grooves of the chuck that their front ends, when made bell-shaped and closed to the diameter of the chuck, shall form a circle, as shown at K in Figs. 2 and 4, and have slots *k* cut through them to receive cutters that may be adjusted to any desired position. The importance of the bell-shaped termination of the cutters will be at once perceived when it is understood that they always act to guide and hold the stick centrally in the chuck and cutters, and they also, being in contact with the turned stick at the end of their curve, serve to rub it smooth after it has been reduced to the diameter desired.

A ring-frame, L, carrying a revolving ring, M, within it, is supported around the chuck and is free to move back and forth on guide-rods *a a*, attached to the front cross-brace of the frame, spiral springs *b b* being placed on the rods to tend to keep the ring-frame forward at the smallest diameter of the chuck.

A bifurcated lever, N, is pivoted to the bar O, which rests centrally on the bed-pieces, and extends upward, so that its forked terminations shall press against the ring-frame, and the back movement of this lever presses the ring-frame toward the base of the cone-shaped chuck, while the springs *b b* serve to keep the ring-frame always pressed against the lever, and thus the return motion of the ring-frame toward the small end of the cone-shaped chuck is secured.

A pattern-cam, P, is secured to a shaft, Q, supported on the front legs of the frame. As shown in the drawings, this pattern-cam is divided into two parts to turn broom-handles, one handle being completed at each half-revolution of the pattern-cam, which is constantly in contact with the face of the bifurcated lever N, and when the larger end of the stick from which the handle is to be made enters the cutters the ring-frame is at the shortest radius of the cam; but as the cam rotates its regularly-increasing radius forces the ring-frame back toward the base of the cone-chuck, and when the cam has completed its half-revolution the smaller end of the broom-handle is turned and finished with a true taper.

Directly in front of the cone-mouth of the taper-chuck I place two feed-wheels, *c* and *c'*, coupled by cog-wheels *d* and *d'* on independent shafts e and e', supported in suitable bearings in brackets D and D' and in the frame. The cam-shaft Q carries a belt-pulley for the belt f to drive the lower feed-roller shaft, and through the gearing the upper; and draw-rollers g and g' are situated at the rear end of the hollow mandrel, which may be operated in any suitable manner to deliver the handle therefrom when turned.

On an extended portion of the frame I place brackets R and R, to receive any desired number of blank pieces to be turned, and hold them so that while one presses on the other the lower one is always directly in line with the hollow mandrel, the brackets being so placed that one end of the blank shall always be as close to the feed-rollers as will permit them to revolve freely.

A spring, h, is so attached at its lower end to the bar O that its upper end is at all times bearing against the pattern-cam P. Secured to the upper end of the spring h, a rod, i, connects it with a lever, k, pivoted in the bar O, and carrying a head or hammer, l, at its upper end, directly in line with the lower blank in the brackets.

The operation is as follows: The blanks being placed in the brackets, which may be vertical or inclined and large enough to accommodate any desired number of blanks, the cutters set in proper position and put in rotation, the required motion being at the same time imparted to the pattern-cam, the spring h will fall from the largest radius of the pattern-cam to the smallest and cause the hammer l to strike the lowest blank in the brackets with sufficient violence to drive the blank forward between the feed-wheels, which will introduce it into the chuck, where the cutters, being opened to their largest capacity by their centrifugal motion, will begin to reduce the blank for its largest diameter, and it is continuously kept progressing against the cutters by the feed-wheels. Now, as the rotation of the pattern-cam forces the ring-frame upon the cone, the diameter of the cutters is uniformly diminishing, and thus as the blank progresses it is turned with a regular taper, and when it is discharged from the feed-rollers its turned end has passed between and is grasped by the draw-rollers, which deliver it, turned completely and smoothed by the friction of the bars at their last curve, behind the cutters.

What I claim as my invention, and desire to secure by Letters Patent, is—

1. The cone-shaped hollow chuck combined with the expanding cutters, constructed, arranged, and operating substantially as and for the purpose described.

2. The combination of the pattern-cam, cone-chuck, bifurcated lever N, and sliding ring, substantially in the manner and for the purpose described.

3. The combination of the chuck, the pattern-cam, feed-wheels, brackets, and hammer, arranged and operating substantially as and for the purpose described.

In testimony whereof I have hereunto subscribed my name.

J. BURNS WEST.

Witnesses:
CHAS. M. GORMLEY,
J. I. PEYTON.